(No Model.)

J. E. FOX.
CIRCULAR SAW.

No. 568,754.

2 Sheets—Sheet 1.

Patented Oct. 6, 1896.

Witnesses.
G. W. Lawton
S. T. Kelsey Jr.

Inventor.
J. E. Fox.
by H. L. Reynolds;
his atty.

(No Model.)　　　　　　　　　　　　　　　　　　　　2 Sheets—Sheet 2.
J. E. FOX.
CIRCULAR SAW.

No. 568,754.　　　　　　　　　　　　　Patented Oct. 6, 1896.

Witnesses.
J. W. Lawton
E. T. Kelsey Jr

Inventor.
J. E. Fox.
by H. L. Reynolds,
his atty.

THE NORRIS PETERS CO., PHOTO-LITHO., WASHINGTON, D. C.

UNITED STATES PATENT OFFICE.

JACOB E. FOX, OF SEATTLE, WASHINGTON.

CIRCULAR SAW.

SPECIFICATION forming part of Letters Patent No. 568,754, dated October 6, 1896.

Application filed February 26, 1896. Serial No. 580,904. (No model.)

*To all whom it may concern:*

Be it known that I, JACOB E. FOX, a citizen of the United States, residing at Seattle, in the county of King and State of Washington, have invented certain new and useful Improvements in Circular Saws; and I do hereby declare the following to be a full, clear, and exact description of the invention, such as will enable others skilled in the art to which it appertains to make and use the same.

My invention relates to an improved form of circular saw, intended more particularly for shingle-sawing, resawing or splitting other lumber, and other similar work.

It consists, essentially, of a very thin saw, which is radially slotted to allow for expansion due to heating by running and is reinforced and stiffened by circular plates of steel placed upon one or both sides, as may be required by the particular kind of work, which plates are ground to a bevel at their edges.

Figure 1:
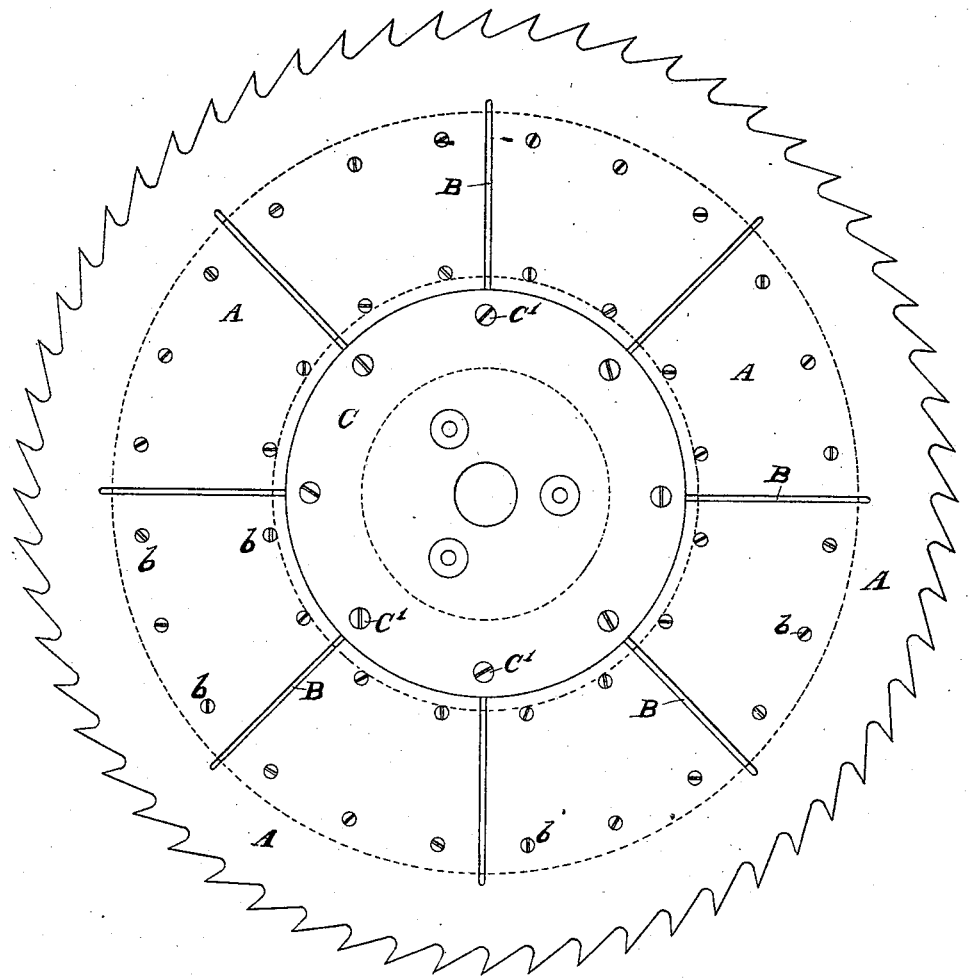
Figure 2:
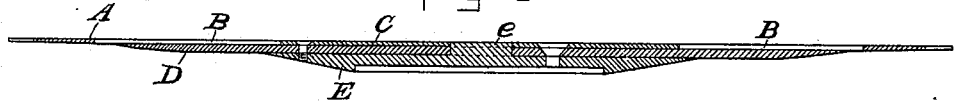
Figure 3:
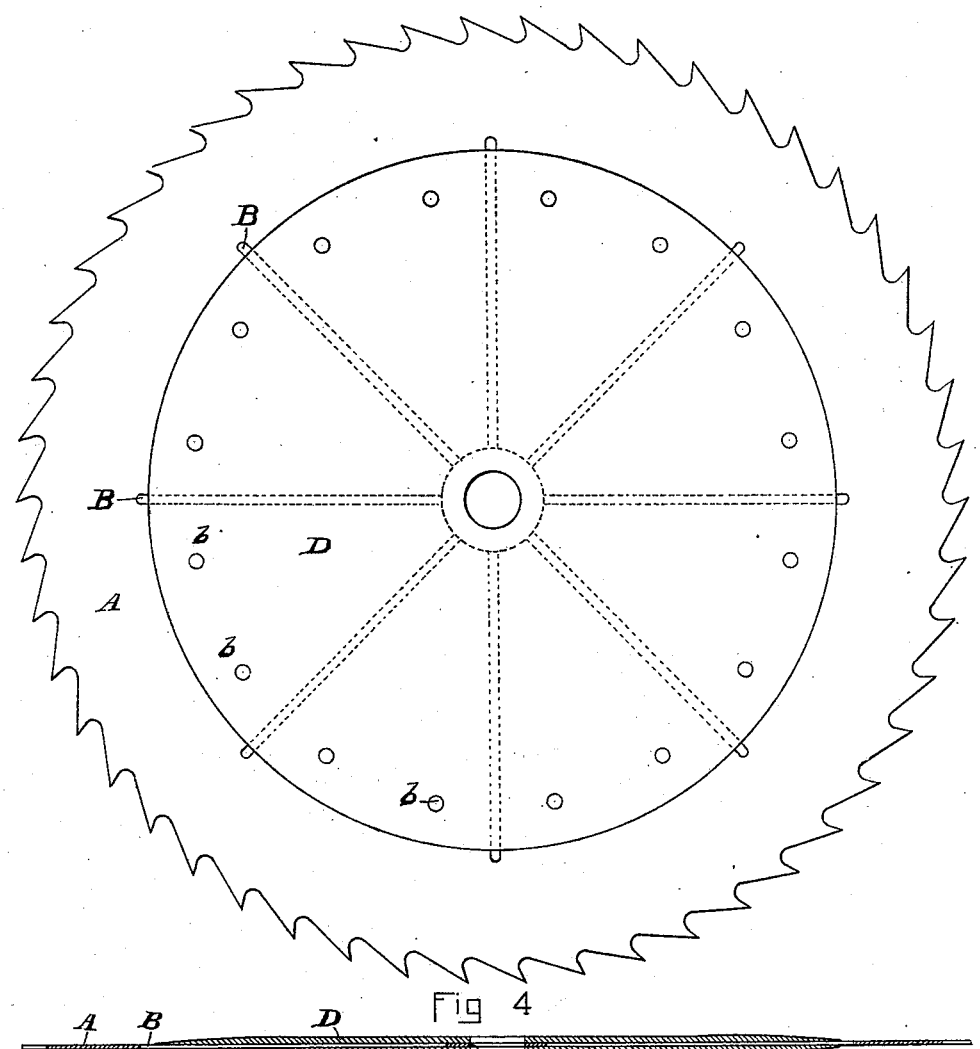
Figure 4:

Figures 1 and 2 are plan and section of my improved saw as built for use as a shingle-saw. Figs. 3 and 4 are similar views of the saw as adapted to a slitting-saw or resaw.

The saw proper, A, or that part upon which the teeth are formed, is made of very thin steel, being two or three gages thinner than is ordinarily used for the same work. It has a number of radial slots B, extending from the central aperture to near the outer edge, leaving sufficient metal to form a solid rim about the saw and connect the different sections. These separated inner segments are all attached by screws $b$ to a steel plate D. The hole in the center of the saw, as shown in Figs. 1 and 2, is quite large, being large enough to receive the plate C. In a saw for this purpose it is better to keep the saw proper mainly in the form of a comparatively narrow band or zone extending from the outer rim inward. In the drawings this is shown as extending about half-way to the center.

The plate C is centered by fitting tightly over the boss $e$ of the cast-iron head-plate E, which is bolted to the end of the shaft. The boss $e$ centers the plate C, and this in turn centers the saw A. The boss $e$ also centers the stiffening and carrying plate D. The plate C is screwed to the plate D and also to the head-plate E.

In the resaw or slitting-saw, as shown in Figs. 3 and 4, the slots extend to the central hole, but this hole is considerably smaller than in the shingle-saw. In this case there is a stiffening-plate D upon each side and a collar F immediately surrounding the shaft and within the central hole of the saw, which is made slightly thicker than the saw, say one gage thicker. This permits clamping the saw firmly between the collars which are usually used for this purpose without binding the inner ends of the saw-segments, thus leaving them free to expand and contract.

The outer edges of the stiffening-plates D in all cases are ground to a sharp edge, so that it will easily enter between the two parts of the board being sawed to separate them. In some cases the outer rim of the saw is also beveled slightly, so that it is thinner at the edge than elsewhere. This results in the production of less sawdust and hence a larger useful product from the same amount of timber. The radial slots allowing free expansion without distortion permits heavier feeding and greater crowding than possible otherwise, and hence results in more work. It prevents distortion and the necessity for frequent hammering.

In running a saw at high speeds it is under different tension from what it is at low speeds. The friction of the saw upon the wood varies, being greater at or near the rim than at the center. These facts tend to cause a saw which is in balance and true when still to get out of balance and wabble or run untrue when speeded up or when at work. This is cured in my improved saw by the radial slots. The outer solid rim holds the sections together and gives the same continuity of the rim as in an ordinary circular saw. The stresses upon this narrow band would be practically equal at all times, as all parts of it are subjected to the same conditions. The inner portions, where the conditions are different, are free to expand by reason of the radial slots. By constructing the beveled stiffening-plates of steel instead of cast-iron they may be made much thinner and have the same strength.

Having thus described my invention, what I claim, and desire to secure by Letters Patent, is—

1. The combination of a circular saw having radial slots extending from near the rim to the central opening with a stiffening-plate fastened to the side thereof, substantially as shown and described.

2. The combination of a circular saw having a central hole of large diameter and radial slots extending from near the rim to the central hole with a circular plate of the same thickness as the saw filling the central hole therein, and a stiffening-plate attached to one side of the saw and central plate, substantially as shown and described.

3. In a circular saw the combination of a head-plate having a central hub or boss, a stiffening-plate having a central hole to fit said hub, and a circular plate having a central hole to fit the same hub, with a circular saw having a large opening to fit over the above circular plate and radial slots extending from this central opening to near the rim and means for fastening it to the stiffening-plate, substantially as shown and described.

4. In a circular saw the combination with the saw having radial slots extending from near the rim to the central opening, a collar within this opening and fitting closely over the central shaft, said collar being a gage thicker than the saw, with a stiffening-plate upon each side of the saw and means for attaching the said stiffening-plates to the saw, substantially as shown and described.

In testimony whereof I affix my signature in presence of two witnesses.

JACOB E. FOX.

Witnesses:
GEORGE DONWORTH,
SCOTT CALHOUN.